US011046413B2

(12) United States Patent
Hooker

(10) Patent No.: US 11,046,413 B2
(45) Date of Patent: Jun. 29, 2021

(54) FINLETS FOR AIRCRAFT AFT-BODY DRAG REDUCTION

(71) Applicant: VORTEX CONTROL TECHNOLOGIES, LLC, Keenesaw, GA (US)

(72) Inventor: John Rick Hooker, Acworth, GA (US)

(73) Assignee: Vortex Control Technologies, LLC, Keenesaw, GA (US)

( * ) Notice: Subject to any disclaimer, the term of this patent is extended or adjusted under 35 U.S.C. 154(b) by 283 days.

(21) Appl. No.: 16/052,193

(22) Filed: Aug. 1, 2018

(65) Prior Publication Data

US 2019/0344876 A1 Nov. 14, 2019

Related U.S. Application Data

(60) Provisional application No. 62/669,635, filed on May 10, 2018.

(51) Int. Cl.
*B64C 23/06* (2006.01)
*B64C 1/00* (2006.01)
*F15D 1/00* (2006.01)

(52) U.S. Cl.
CPC .......... *B64C 1/0009* (2013.01); *B64C 23/06* (2013.01); *F15D 1/009* (2013.01)

(58) Field of Classification Search
CPC ....... B64C 1/0009; B64C 23/06; F15D 1/003; F15D 1/009; F15D 1/12; Y02T 50/10
USPC ....................................................... 244/130
See application file for complete search history.

(56) References Cited

U.S. PATENT DOCUMENTS

| 4,696,442 A * | 9/1987 | Mazzitelli | B64C 23/06 244/200.1 |
|---|---|---|---|
| 5,089,402 A | 2/1992 | Uchiyama et al. | |
| 6,715,717 B2 | 4/2004 | Dixon et al. | |
| 8,226,038 B2 | 7/2012 | Smith et al. | |
| 9,637,223 B1 * | 5/2017 | DiCocco | F42B 15/01 |
| 2004/0046086 A1 | 3/2004 | Dixon et al. | |
| 2011/0180146 A1 | 7/2011 | Smith et al. | |

(Continued)

OTHER PUBLICATIONS

International Search Report dated May 23, 2019 from corresponding International Patent Application No. PCT/US2019/022692, 3 pages.

(Continued)

*Primary Examiner* — Claude J Brown
(74) *Attorney, Agent, or Firm* — Ohlandt, Greeley, Ruggiero & Perle, L.L.P.

(57) ABSTRACT

A system and a method for reducing drag on the aft-fuselage of an aircraft are provided, which system and method utilize at least one finlet provided on each side of the aft-fuselage of an aircraft for reducing drag—on the aft-fuselage, which finlets are (i) positioned at the rear half of an upswept portion of the aft-fuselage starting at a breakline, (ii) positioned in the path of the vortices generated by the aft-fuselage, and (iii) oriented at 1 to 9 degrees angle relative to the local airflow about the aft-fuselage of the aircraft to straighten the airflow about the aft-fuselage. In addition, the finlets generate an induced secondary vortex having an opposite rotation direction relative to the rotation direction of the vortices generated by the aft-fuselage, thereby counteracting the vortices generated by the aft-fuselage.

15 Claims, 16 Drawing Sheets

(56) References Cited

U.S. PATENT DOCUMENTS

2012/0049001 A1* 3/2012 Smith .................... B64C 23/06
                                                    244/130
2013/0001362 A1   1/2013 Kreuzer et al.
2018/0334249 A1* 11/2018 Binks .................... B64C 23/06

OTHER PUBLICATIONS

Written Opinion dated May 23, 2019 from corresponding International Patent Application No. PCT/US2019/022692, 9 pages.
Thuloweit, Kenji; "C-17 Drag Reduction Testing Aims At Saving Fuel", Air Force Materiel Command, Mar. 29, 2016, 2 pages, [May 5, 2019], Retrieved from internet: <URL: https://www.afmc.af.mil/NewsArticle-DIsplay/Article/803694/c-17-drag-reduction-testing-aims-at-saving-fuel/>.
International Preliminary Report on Patentability dated Nov. 19, 2020 from corresponding International Patent Application No. PCT/US2019/022692, 7 pages.

* cited by examiner

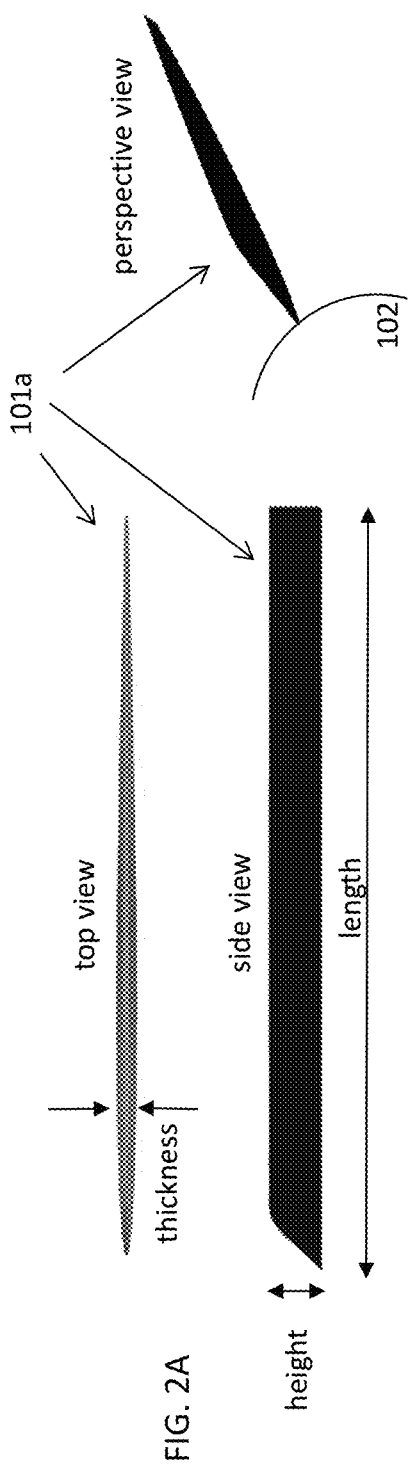
FIG. 2A Curved Finlet based on symmetrical airfoil sections
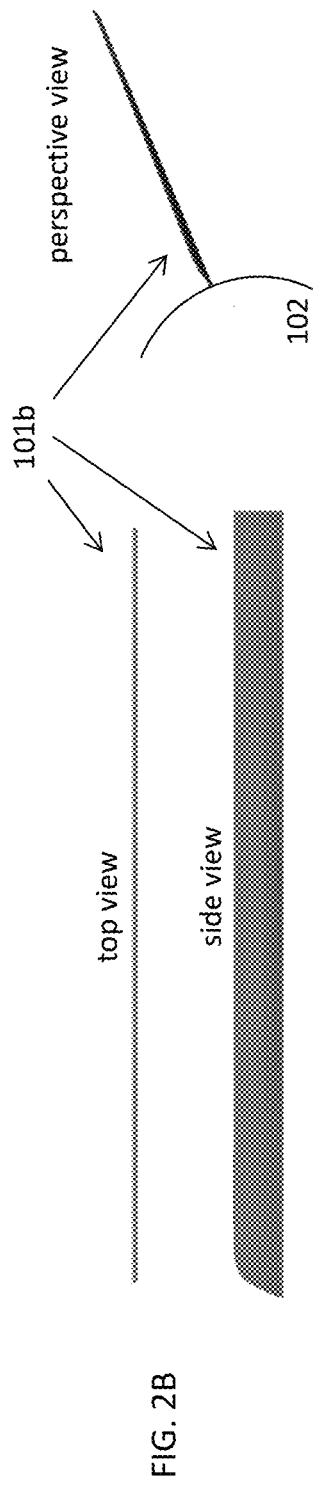
FIG. 2B Flat Finlet based on constant thickness plate with curved LE Finlets Installed Baseline – No Finlets

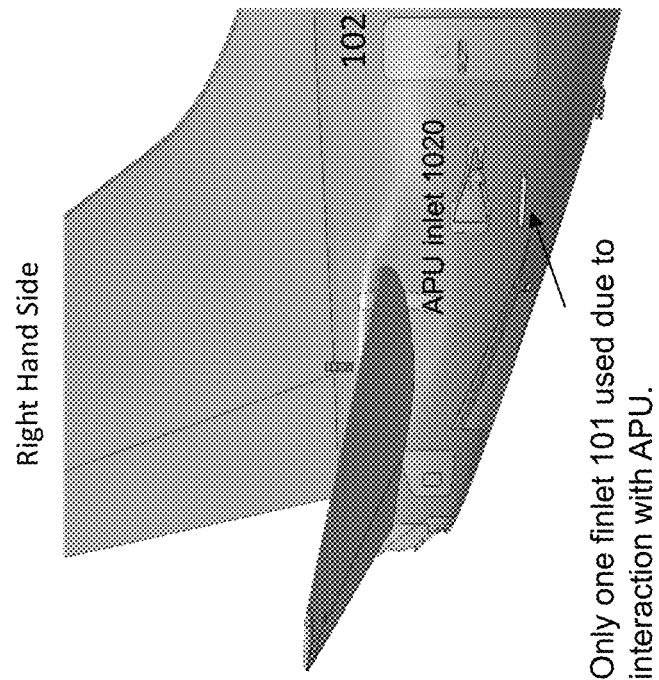
FIG. 4D (Example Alternate Finlet Configuration)
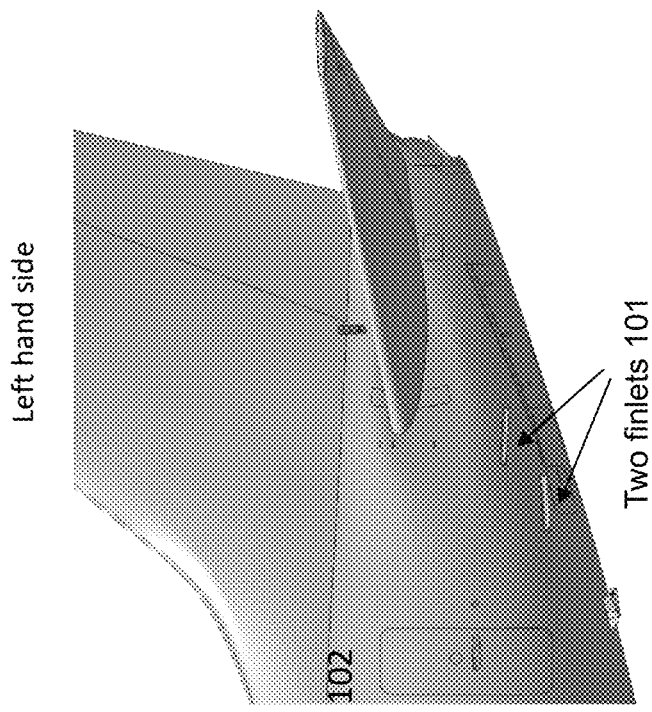
FIG. 4C (Example Alternate Finlet Configuration)

Example Finlet Shape

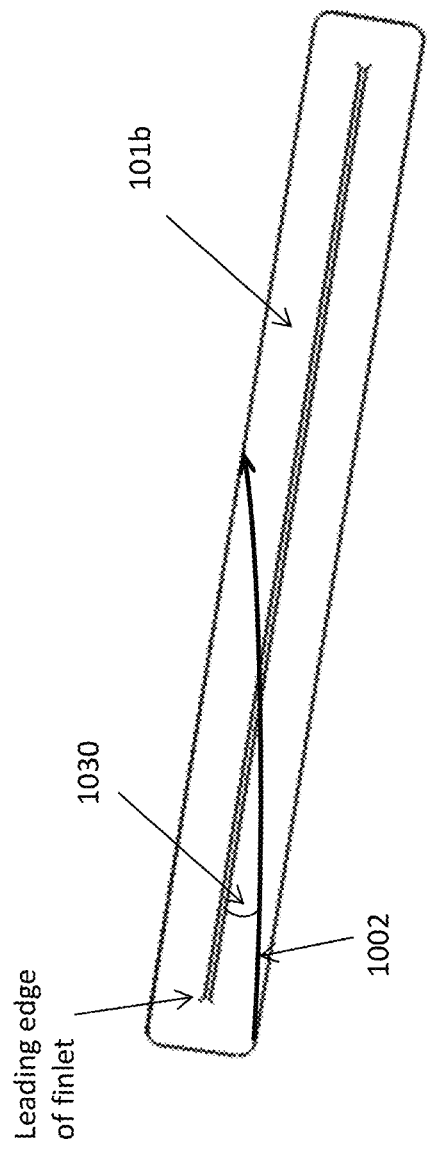
FIG. 7: Example Finlet Orientation
Note: Fuselage side cut-away shown flat for clarity.

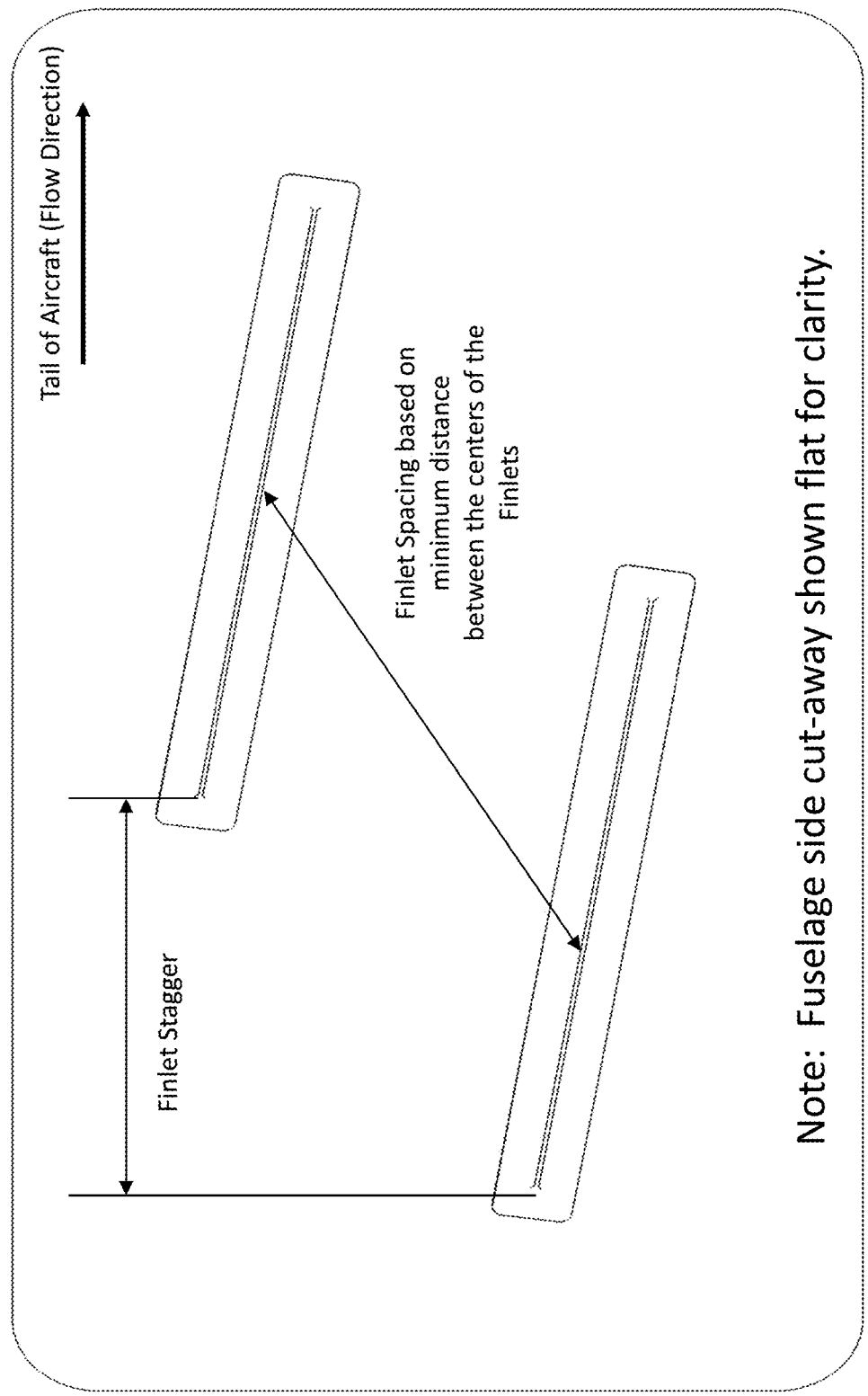
FIG. 8: Example Finlet Spacing and Stagger.

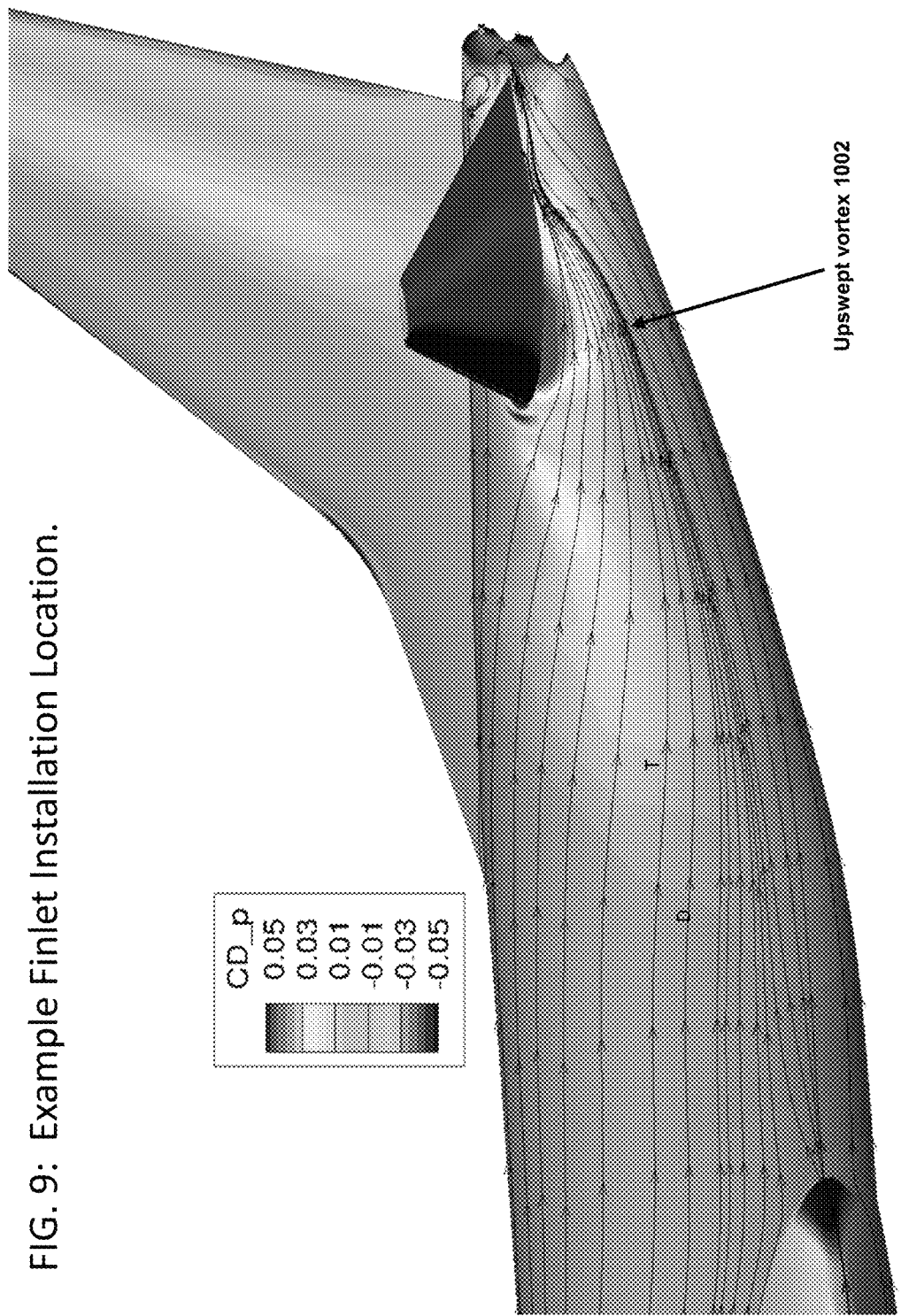
FIG. 9: Example Finlet Installation Location.

Aft Only

Angle change

Baseline

Fwd Only

FINLETS FOR AIRCRAFT AFT-BODY DRAG REDUCTION

CROSS REFERENCE TO RELATED APPLICATIONS

This application claims the benefit under 35 U.S.C. § 119(e) of U.S. Provisional Patent Application Ser. No. 62/669,635, entitled "FINLETS FOR AIRCRAFT AFT-BODY DRAG REDUCTION," filed on May 10, 2018, which is hereby incorporated by reference.

BACKGROUND OF THE DISCLOSURE

1. Field of the Disclosure

The present disclosure relates to a device for reducing drag on an aircraft body. More particularly, the present disclosure relates to at least one finlet provided on aft-fuselage of an aircraft for reducing drag on the aircraft.

2. Description of the Related Art

A conventional aft-fuselage drag reduction device is disclosed in U.S. Pat. No. 6,715,717 (hereinafter referred to as "the '717 patent"). The '717 patent discloses multiple fin-shaped vortex control devices (VCDs) positioned along the undersurface of an upswept aft-fuselage (part of aft-body) of an aircraft, which VCDs are angled nose-down relative to the local aft-fuselage streamline (or airflow). The VCDs disclosed in the '717 patent reduce drag primarily by generating a series of induced vortices of the same sign as that naturally generated by the aft fuselage. These VCD-induced vortices reattach the aft-fuselage separated airflow by re-energizing the fuselage boundary layer, thereby reducing the overall aft-fuselage drag. This technique is suited for military transport aircrafts with significant amounts of aft-fuselage flow separation and very strong fuselage-generated vortices caused by the large aft-fuselage upsweep angles inherent in military transport aircrafts such as the C-130 and C-17 transports. However, this approach is not optimal for commercial aircrafts such as the Boeing 737 and A330, which have much more aerodynamically efficient aft-fuselage shapes with minimal upsweep angle (since the commercial aircrafts do not require the aft cargo ramp required for military transport aircraft) and relatively weak aft-fuselage generated vortices.

Another conventional aft-fuselage drag reduction technology is disclosed in U.S. Pat. No. 8,226,038 (hereinafter referred to as "the '038 patent"), which technology is targeted for reducing drag on an aircraft having a highly upswept aft-fuselage. The '038 patent discloses positioning a large number of drag-reducing elements (microvanes) on the fuselage starting from a position at the breakline of the fuselage and extending toward the tail of the aircraft. Each drag-reducing element is positioned at an angle of between 10 and 40 degrees nose up relative to the local aft-body streamline (or airflow). As in the case of the technology disclosed in the '717 patent, the technology of the '038 patent is targeted for reducing drag on an aircraft having a highly upswept aft-fuselage (e.g., military transports such as C-130 and C-17) and very strong resulting fuselage vortices. The drag-reducing elements (microvanes) of the '038 patent operate to reduce the production of vortices at the upswept aft-fuselage resulting from the airflow about the fuselage. The microvanes of the '038 patent reduce the overall aft-fuselage vorticity by generating many small vortices opposite in direction to those naturally generated by the aft-fuselage, which vortices generated by the microvanes collectively reduce the overall vorticity. The '038 patent utilizes at least 15 microvanes per each side of the aft-fuselage, and the number of microvanes on each side may be 100. Each individual microvane disclosed in the '038 patent is 2 inches or less in height and less than 25 inches in length. The '038 patent discloses that the microvanes are positioned on each side of the aircraft fuselage beginning at the breakline (i.e., where the substantially constant cross-section the aft-fuselage starts to taper towards the rear). As in the case of the technology disclosed in the '717 patent, the technology of the '038 patent is not optimal for commercial aircrafts which have much more aerodynamically efficient aft-fuselage shapes with minimal upsweep angle and relatively weak aft-fuselage generated vortices.

An initial assessment of the aft-fuselage drag reduction potential of both technologies represented with the '717 and '038 patents was performed on an aerodynamically efficient commercial aircraft using extensively validated analytical tools and processes. Results from this extensive assessment indicated that an aft-fuselage drag reduction is not possible using this existing technology applied to an aerodynamically efficient commercial aircraft with smaller upsweep angles than the military aircraft these technologies were developed on. With the smaller upsweep angles there is no significant aft-fuselage flow separation that the technology described in the '717 patent could re-attach through boundary layer re-energization. Likewise, the vortices generated from the smaller aft-fuselage upsweep angles were relatively weak and further reduction of their vorticity using the technology described in the '038 patent resulted in an increase in drag caused by the drag of the microvanes themselves.

Therefore, there is a need for a system and a method for reducing drag on the aft-fuselage of an aircraft, which system and method do not require a large number of drag reducing elements and are optimized for commercial aircrafts which have a more aerodynamically efficient aft-fuselage shapes with smaller upsweep angles and relatively weak aft-fuselage generated vortices.

BRIEF SUMMARY OF THE DISCLOSURE

The present disclosure provides a system and a method for reducing drag on the aft-fuselage of an aircraft, which system and method are optimized for commercial aircrafts which have much more aerodynamically efficient aft-fuselage shapes with minimal upsweep angle and relatively weak aft-fuselage generated vortices.

The present disclosure also provides such a system and a method for reducing drag on the aft-fuselage of an aircraft, which system and method utilize at least one (inlet provided on the aft-fuselage of an aircraft for reducing drag on the aft-fuselage, which aircraft has an aerodynamically efficient aft-fuselage shapes with minimal upsweep angle and relatively weak aft-fuselage generated vortices.

The present disclosure further provides such a system and a method for reducing drag on the aft-fuselage of an aircraft, which system and method utilize at least one finlet provided on each side of the aft-fuselage of an aircraft for reducing drag on the aft-fuselage, which finlets are (i) attached to a rear half of an upswept portion of the aft-fuselage of the aircraft, the upswept portion extending rearward starting at a breakline, and (ii) positioned in the path of the vortices generated at the aft-fuselage by the airflow about the aft-fuselage.

The present disclosure still further provides such a system and a method for reducing drag on the aft-fuselage of an aircraft, which system and method utilize at least one finlet provided on each side of the aft-fuselage of an aircraft for reducing drag on the aft-fuselage, which finlets are oriented slightly nose-up relative to the local airflow about the aft-fuselage of the aircraft.

The present disclosure also provides a system and a method for reducing drag on the aft-fuselage of an aircraft, which system and method utilize one to three finlets provided on each side of the aft-fuselage of an aircraft for reducing drag on the aft-fuselage, which finlets are oriented at an angle in the range of 1 to 9 degrees relative to the local airflow about the aft-fuselage of the aircraft to straighten the airflow about the aft-fuselage and eliminate upwash, thereby increasing pressure recovery on the aft-fuselage and reducing drag. The flow straightening is accomplished by the finlets through a combination of direct flow turning and the generation of a secondary vortex oriented to induce downwash, thereby further straightening the airflow near the surface of the aircraft.

BRIEF DESCRIPTION OF THE DRAWINGS

FIG. 2A is a diagram depicting various views of an example finlet embodiment according to the present disclosure.

FIG. 2B is a diagram depicting various views of another example finlet embodiment according to the present disclosure.

FIGS. 4C-4F illustrate another example configuration of finlets attached to the aft-fuselage.

FIG. 7 illustrates an example finlet orientation according to the present disclosure.

FIG. 8 illustrates an example finlet spacing and stagger according to the present disclosure.

FIG. 9 illustrates an example finlet installation location in the rear half of the aft-fuselage.

A component or a feature that is common to more than one drawing is indicated with the same reference number in each of the drawings.

DETAILED DESCRIPTION OF THE DISCLOSURE

Figure 1:
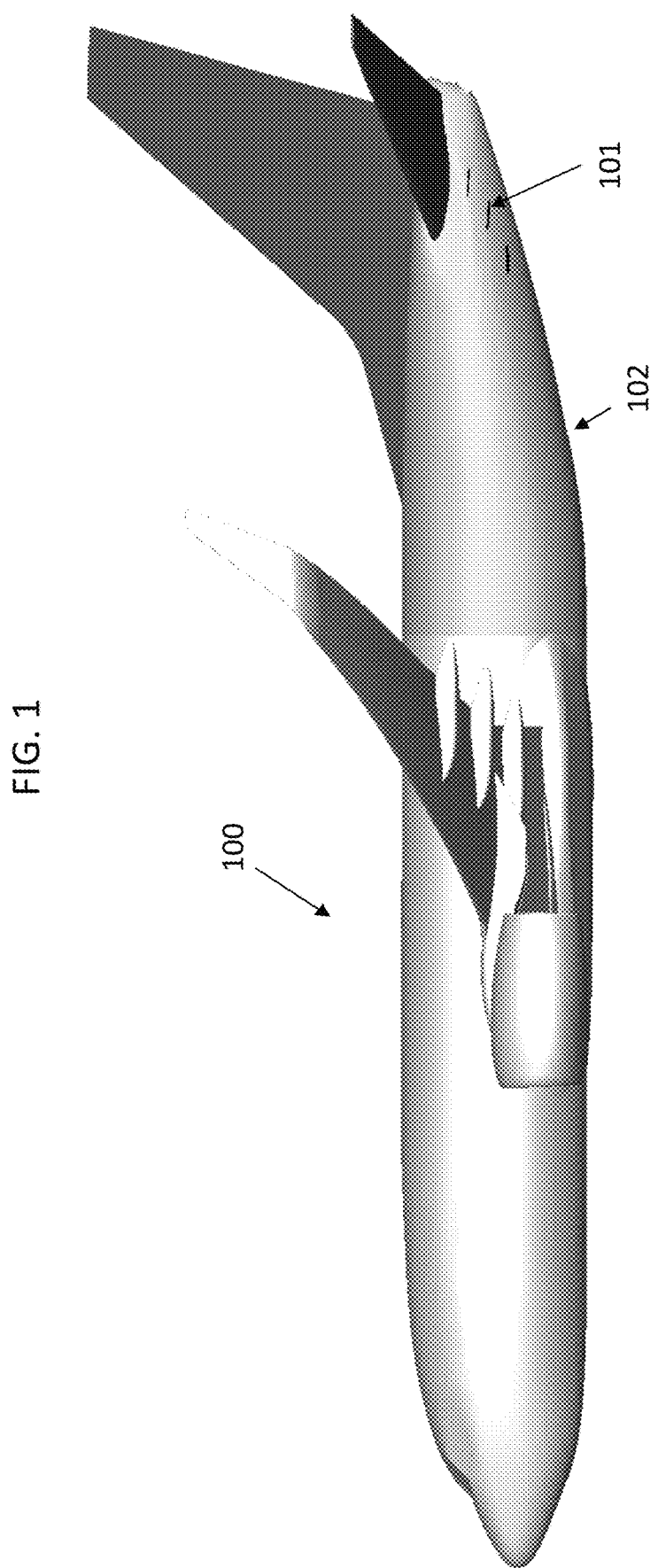
FIG. 1 is a side view of an example commercial aircraft having finlets attached to the aft-fuselage.

FIG. 1 is a side view of an example commercial aircraft 100 having finlets 101 attached to the aft-fuselage 102 of the aircraft. Finlets 101 function as drag reduction devices, as will be explained in greater detail below. Although multiple finlets 101 are shown attached to the aft-fuselage 102, this example is not to be construed as limiting, and it should be noted that the present disclosure encompasses using one or more finlets. In an example embodiment, one to ten finlets can be provided on each side of the aft-fuselage 102, preferably one to three finlets on each side for optimum results. An example embodiment can have different numbers of finlets on each side of the aft-fuselage, e.g., one finlet on one side of the aft-fuselage 102 and two finlets on the other side of the aft fuselage 102, as described in further detail below in connection with FIGS. 4C-4D.

FIG. 2A shows an example embodiment of a finlet 101a attached to the aft-fuselage 102, which finlet 101a has a varying cross-sectional thickness along the length of the finlet, while the height of the finlet is substantially uniform throughout the length of the finlet. FIG. 2B shows another example embodiment of a finlet 101b attached to the aft-fuselage 102, which finlet 101b has a uniform cross-sectional thickness along the length of the finlet, i.e., the finlet is flat, while the height of the finlet is substantially uniform throughout the length of the finlet.

Figure 3B:
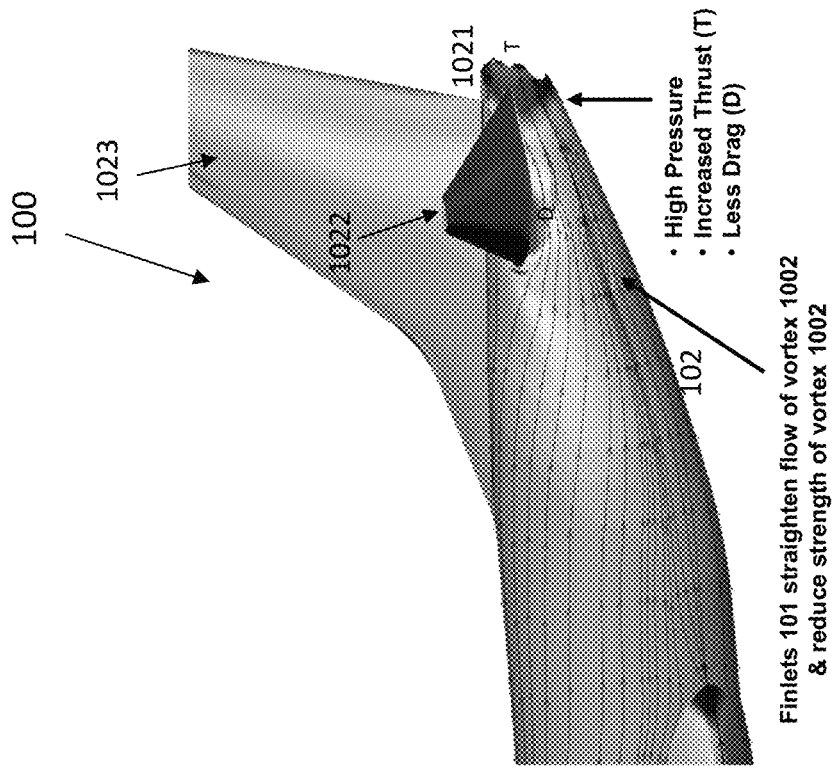
FIG. 3B is a side view of an example commercial aircraft illustrating the drag reduction achieved by finlets attached to the aft-fuselage.
Figure 3A:
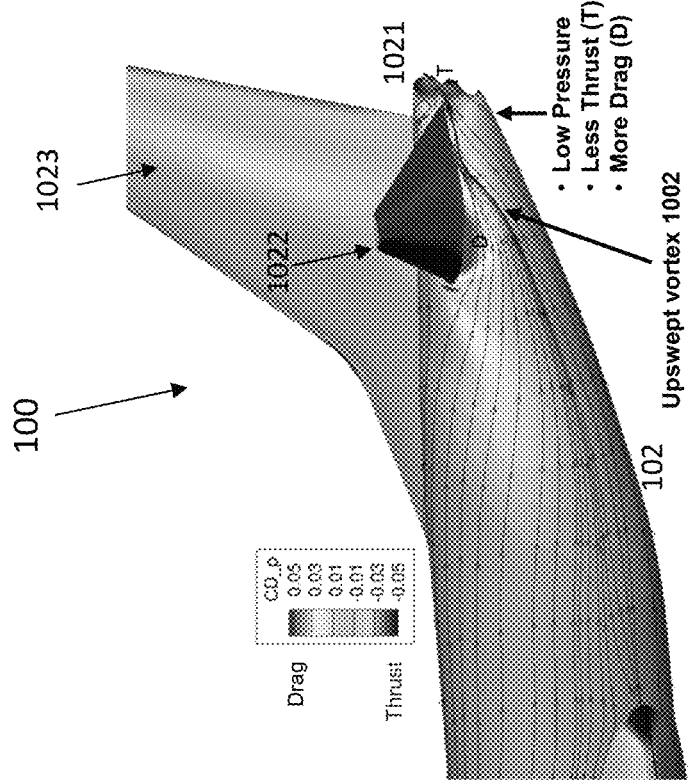
FIG. 3A is a side view of an example commercial aircraft illustrating the drag caused by an upswept vortex.

FIG. 3A is an example commercial aircraft illustrating the drag caused by an upswept vortex. As shown in FIG. 3A, a vortex 1002 is formed along the lower area of the aft-fuselage 102 on either side of the aft-fuselage 102 behind the wings, and the vortex 1002 sweeps up (hence also referred to as "upswept vortex") as it moves towards the rear of the aft-fuselage, thereby causing flow acceleration and an associated decrease in pressure on the fuselage tail cone 1021 located at the base of the vertical stabilizer 1023, which in turn increases drag (e.g., designated by "D" in the region below the horizontal stabilizer 1022) and reduces thrust. As shown in the inset box within FIG. 3A, the term "CD_p" represents the pressure drag, i.e., it is the pressure coefficient [$Cp=(p-pinf)/q$] dotted with the surface normal direction, where q is the dynamic pressure, p is the local pressure, and pinf is the free stream pressure.

FIG. 3B is a side view of an example commercial aircraft illustrating the drag reduction achieved by finlets 101 attached to the aft-fuselage 102. As shown in FIG. 3B, one or more finlets 101 are positioned along the lower area of the aft-fuselage 102 on each side of the aft-fuselage 102, the leading edge (the edge closer to the front of the fuselage) of the finlets 101 being oriented slightly nose-up (e.g., 1-9 degrees for optimum results) relative to the local aft-fuselage streamline (or airflow about the aft-fuselage), an example of which orientation is illustrated in detail in FIG. 7. The finlets 101 reduce drag by achieving two effects.

Figure 4A:
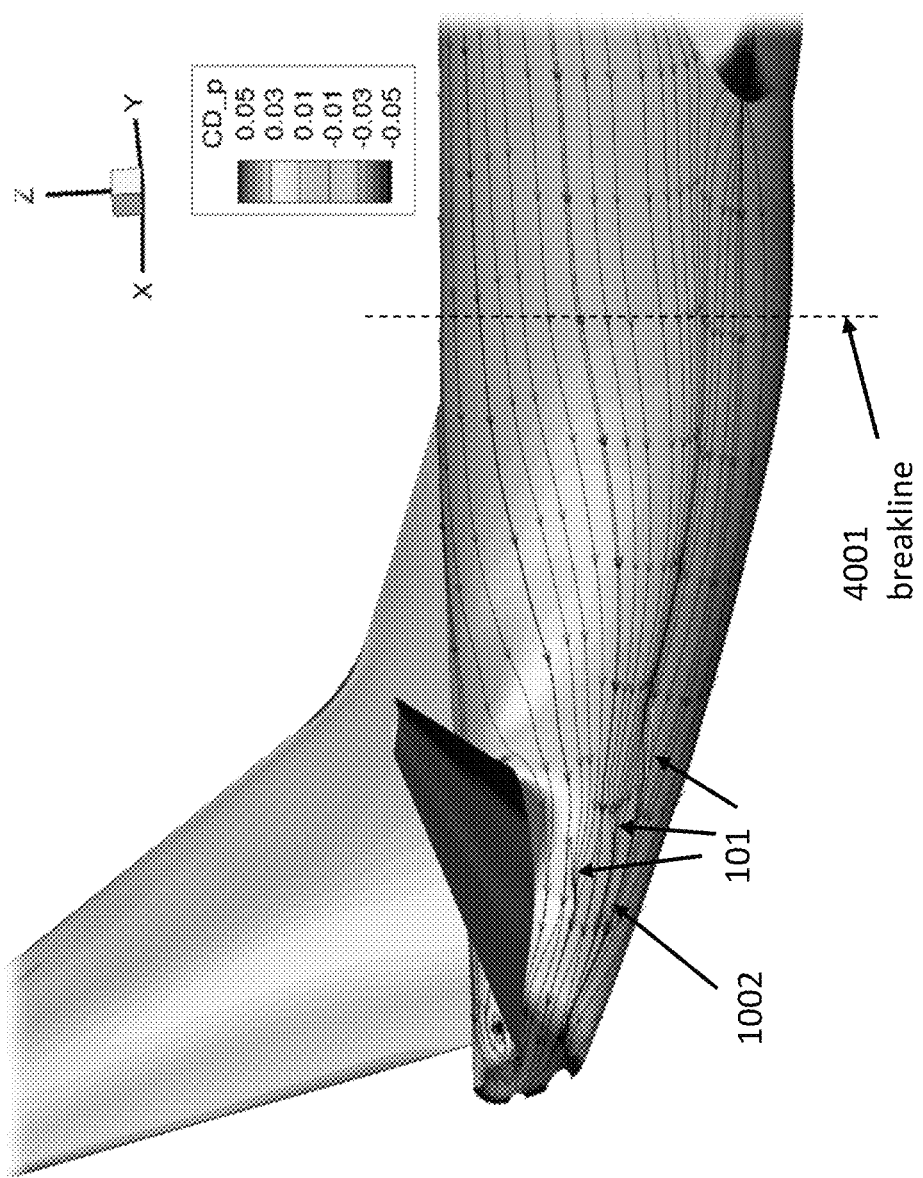
FIG. 4A illustrates the vortex-straightening effect of the finlets attached to the aft-fuselage.

First, the orientation, position and configuration of the finlets 101 generate a downwash that causes straightening of the airflow over the aft-fuselage, thereby significantly reducing the upsweep associated with the vortex 1002 naturally generated by the aft-fuselage 102. The vortex-straightening effect of the finlets 101 can be seen in greater detail in FIG. 4A, which shows the straightened vortex 1002. As shown in FIG. 4A (see also FIGS. 3B and 10), finlets 101 are positioned (i) in the path of the vortex lines, and (ii) at the rear half of an upswept portion of the aft-fuselage of the aircraft, the upswept portion extending rearward starting at a breakline, i.e., where the substantially constant cross-section of the aft-fuselage starts to taper towards the rear.

Figure 4B:
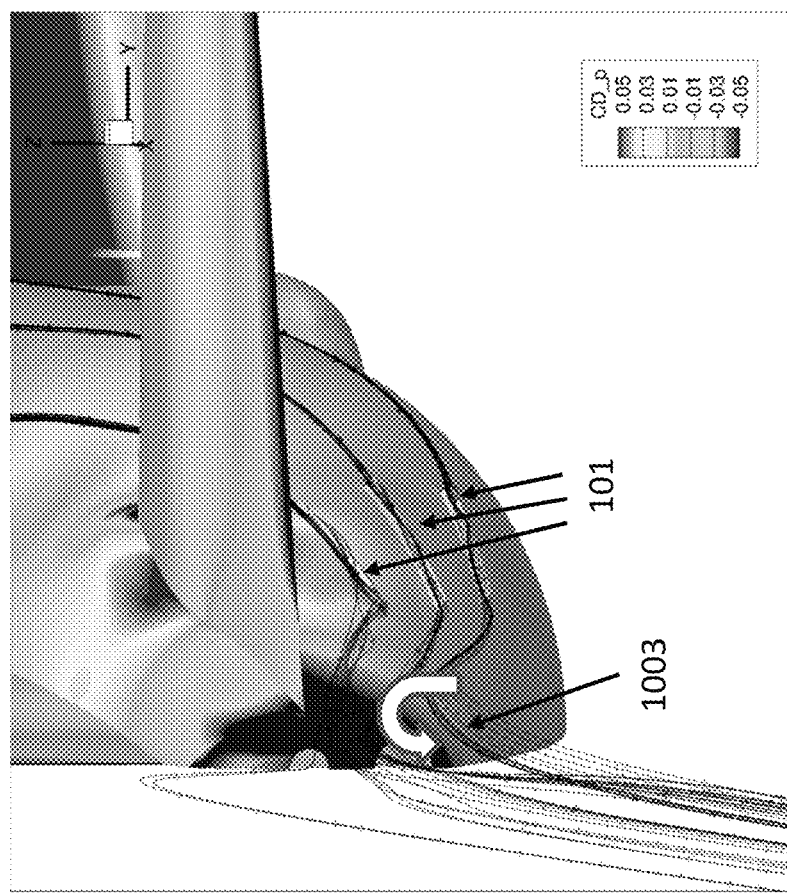
FIG. 4B illustrates a secondary vortex generated by the finlets attached to the aft-fuselage which further straighten the aft-fuselage flow.

Second, in addition to the direct vortex-straightening effect, the orientation, position and configuration of the finlets 101 also generate a secondary vortex 1003 shown in FIG. 4B. The secondary vortex 1003 induces the increased downwash near the fuselage surface, further straightening the vortex and adding to the pressure recovery and reduction in aft-fuselage drag.

Figure 4F:
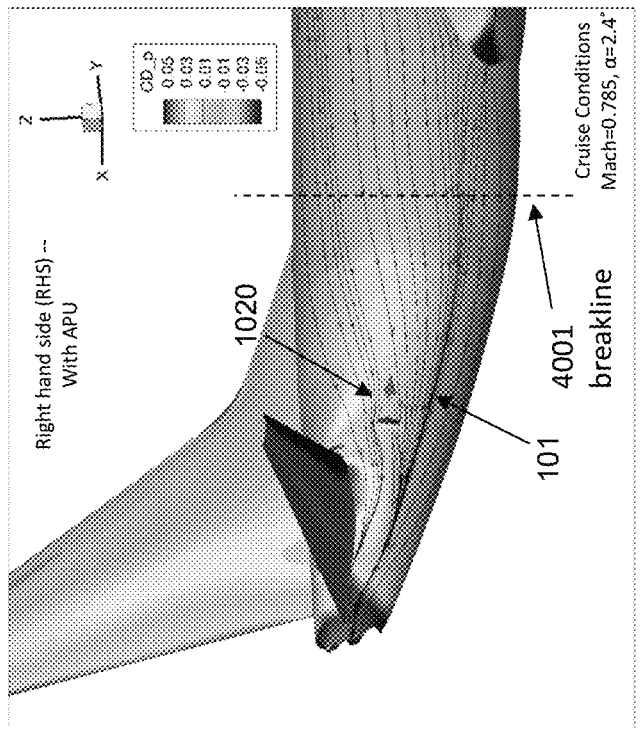
Figure 4E:
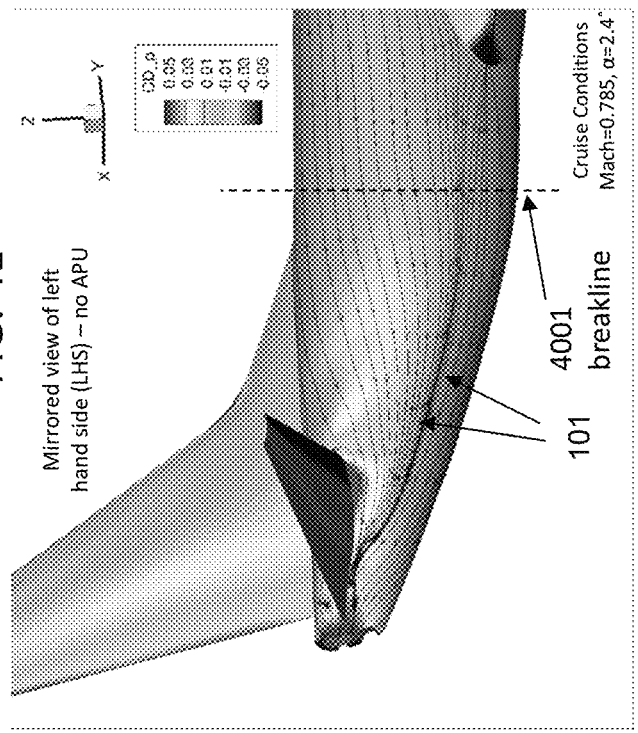

FIGS. 4C-4F illustrate another example configuration of finlets 101 on the aft-fuselage 102. Because the three-finlet configuration shown in FIGS. 4A-4B may require removal of Auxiliary Power Unit (APU) for installation of the finlets, the alternate example configuration (i) positions the finlets 101 more forward in comparison to the configuration shown in FIGS. 4A-4B, and (ii) reduces the number of finlets 101 deployed. For example, as shown in FIGS. 4C-4D, two finlets 101 can be positioned on the left side of the aft-fuselage 102, and one finlet 101 can be positioned on the right side of the aft-fuselage 102. The reason different numbers of finlets on the left-hand side (LHS) (see, e.g., FIG. 4E, showing a mirrored view) and the right-hand side (RHS) (see, e.g., FIGS. F) can be used is that, in this example, the RHS includes an Auxiliary Power Unit (APU) inlet 1020 with what is called an external bicycle vortex generator (bvg), which external bvg has a significant impact on the external flow field as depicted in FIGS. 4E and 4F, and the external bvg functions similarly to the finlets 101 on the LHS. The finlets 101 can be positioned at a location that provides easier installation, e.g., a location which provides easier access to the inside of the airplane. In this example, as few as 1 finlet can be provided on the RHS due to the interaction of the bvg with the flow field. As shown in FIGS. 4E-4F, the finlets 101 of the alternate example configuration are still positioned away from (further aft of) the breakline 4001 of the aft-fuselage, i.e., the finlets 101 are positioned at the rear half of the upswept portion of aft-fuselage, the upswept portion starting at the breakline 4001.

Example Finlet Shape

Figure 5:
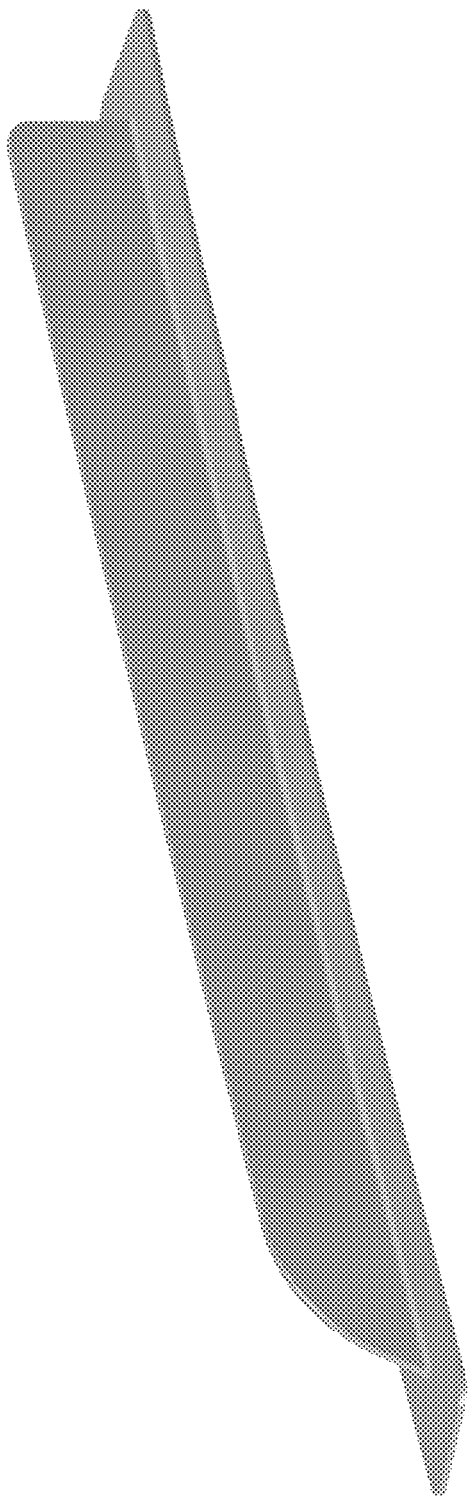
FIG. 5 illustrates an example finlet shape according to the present disclosure.

An example finlet shape according to the present disclosure is depicted in FIG. 5, which finlet shape substantially corresponds to the finlet shape shown in FIG. 2B. In describing this example embodiment and alternate embodiments of the present disclosure, specific terminology is employed for the sake of clarity. The present disclosure, however, is not intended to be limited to the specific terminology so selected, and it is to be understood that each specific element includes all technical equivalents that operate in a similar manner to achieve similar functionality.

Figure 6A:
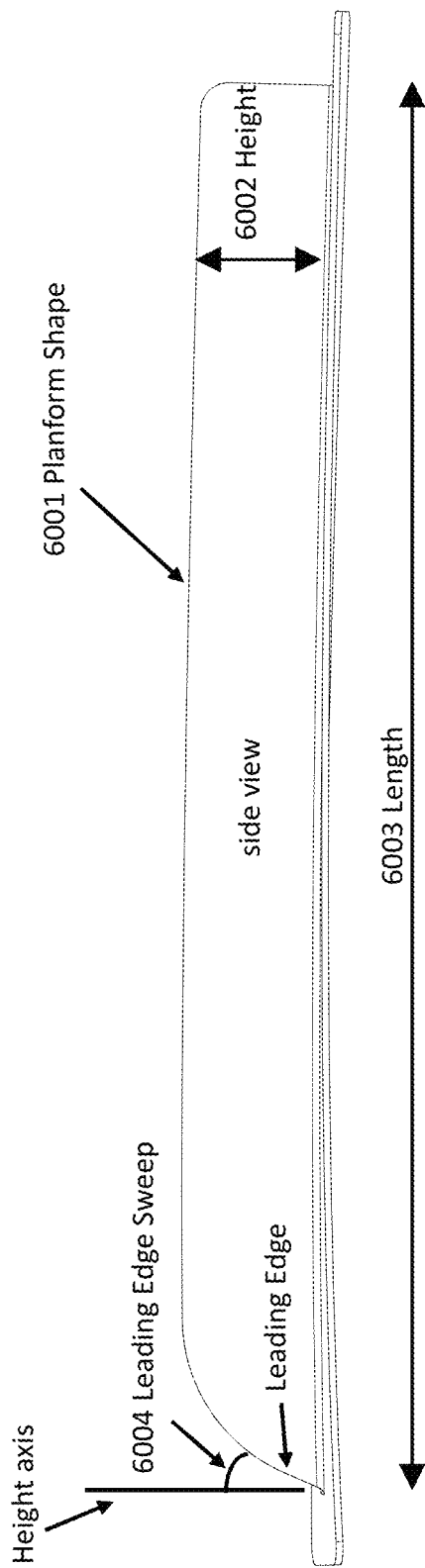
FIGS. 6A-6B illustrate side and front views of an example finlet according to the present disclosure.
Figure 6B:
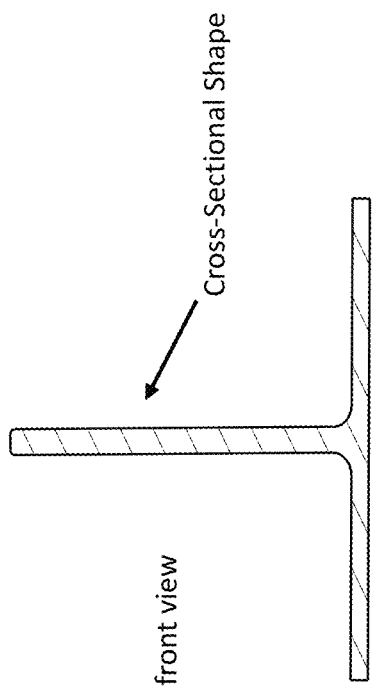

As shown in the example embodiment of FIGS. 6A and 6B, there are a number of parameters required to define the example finlet. These parameters include: planform shape 6001, height 6002, length 6003, leading edge sweep 6004, and cross-sectional shape. A detailed description of each of these parameters follows.

As shown in the example embodiment of FIGS. 6A and 6B, an example finlet height is in the range of 2 to 6 inches for optimum results, an example finlet length is in the range of 25 to 60 inches for optimum results, an example finlet thickness is approximately 0.15 inches, and an example leading edge sweep (i.e., the angle formed between the leading edge of a finlet and the height axis for the finlet) is in the range of 15 to 40 degrees.

Example Finlet Integration

A number of factors influence the example finlet integration, e.g., as depicted in FIGS. 1 and 4A-4D. Specific parameters include, but are not limited to: orientation, spacing, number of finlets, and installation location or placement.

FIG. 7, which is a detailed illustration of an example finlet orientation, shows the finlet angle 1030 formed between the finlet 101b and the local aft-fuselage streamline 1002 (e.g., vortex line). The example finlet orientation to the local streamline is positioned nose-up at an angle in the range between 1 and 9 degrees for optimum results.

FIG. 8 illustrates an example finlet spacing between the respective centers of two adjacent finlets. Optimum finlet spacing ranges from 0.5 to 4 times the length of one of the two adjacent finlets. The finlets shown in the example embodiment of FIG. 8 are the same size, although the finlets do not need to be of the same size.

FIG. 8 also illustrates an example stagger, defined as the distance from the leading edge of a forward finlet to the leading edge of a trailing finlet adjacent to the forward finlet. Optimum stagger ranges from 0.5 to 2 times the length of one of the two adjacent finlets. Stagger is incorporated so that the finlet relative placement to the vortex can be maintained.

Optimum finlet installation location and/or placement is based on maintaining a consistent proximity to the upswept vortex 1002 shown in FIG. 9 and the number, size, and orientation of the finlets.

Figure 10:
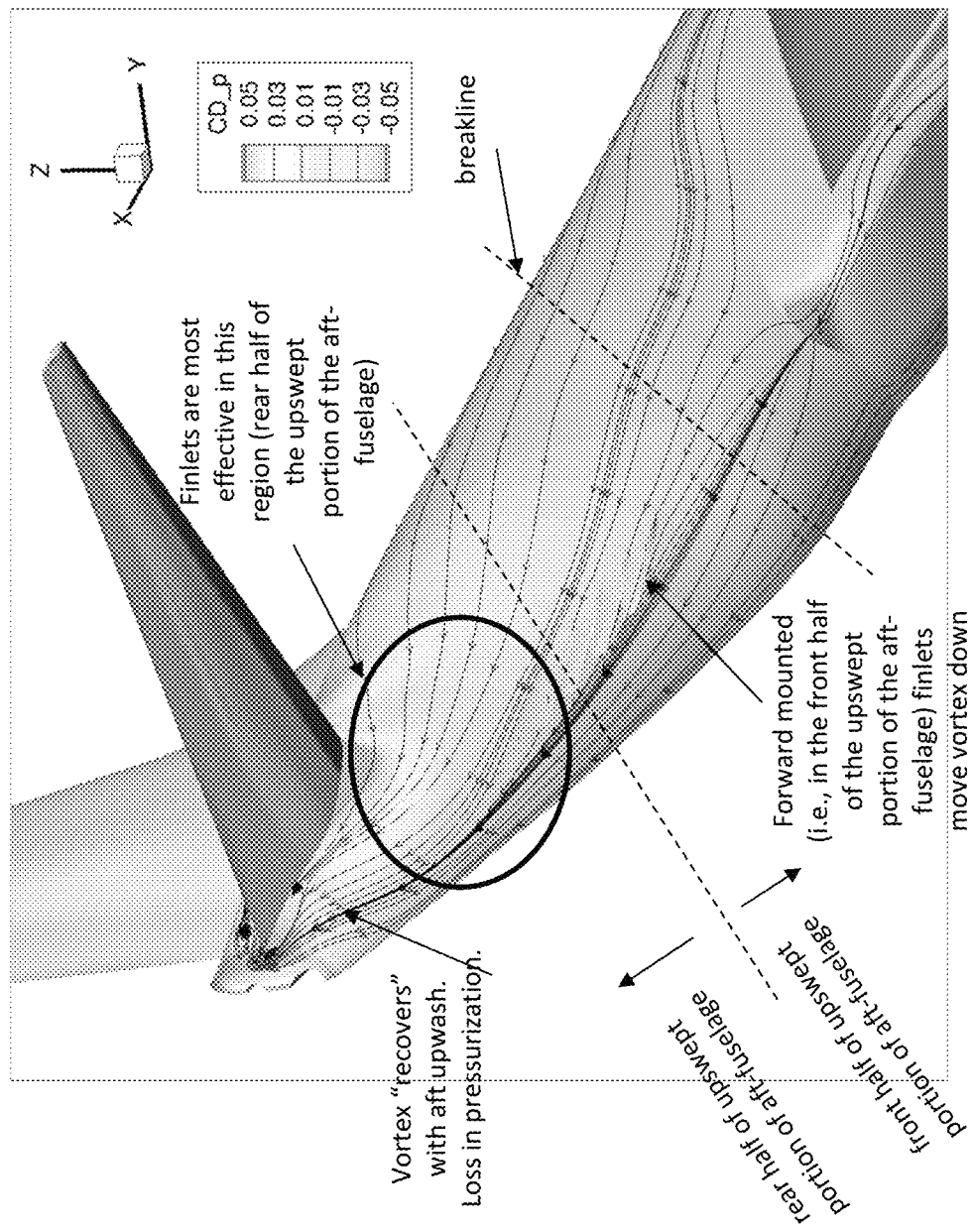
FIG. 10 illustrates an advantageous area of the aft-fuselage for finlet positioning.
Figure 11C:
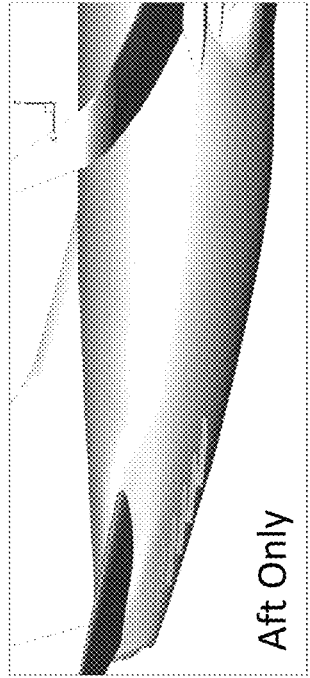
FIGS. 11A-11D illustrate different example finlet arrangements.
Figure 11D:
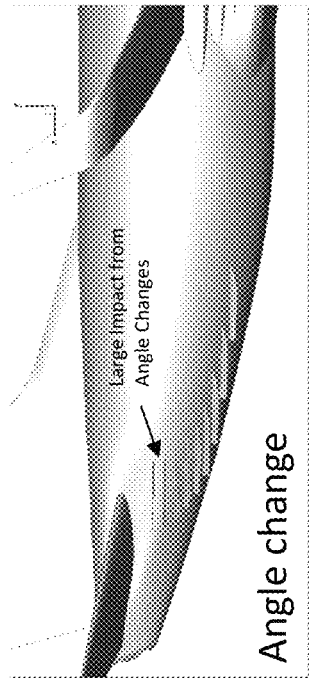
Figure 11A:
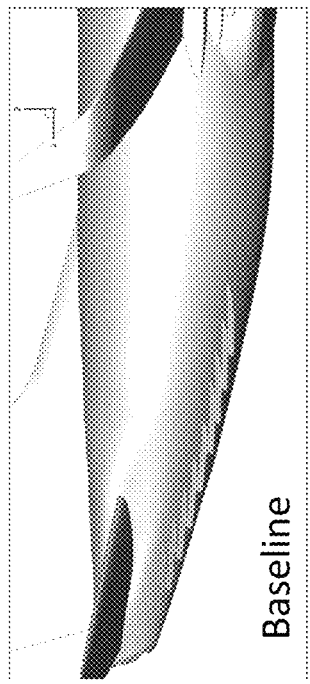
Figure 11B:
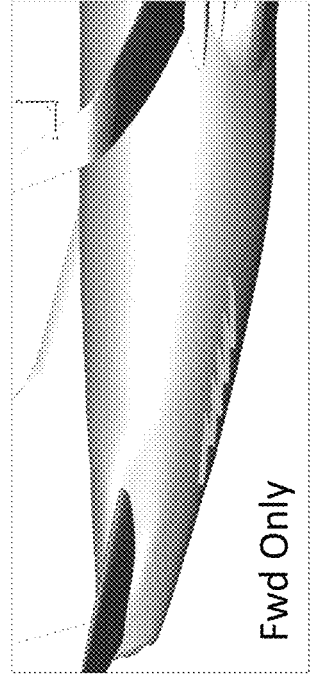

As shown in FIG. 10, experimental data indicate that finlets tend to be most effective in the rear half of the upswept portion of the aft-fuselage, which upswept portion extends rearward starting at the breakline. As shown in FIG. 10, the breakline defines where the substantially constant cross-section of the aft-fuselage starts to taper towards the rear.

Finlets positioned in the front half of the aft-fuselage portion beginning at the breakline are not as effective because the vortex straightened by the finlets can recover and reorient itself as an upwash in the rear half of the aft-fuselage portion beginning at the breakline, thereby resulting in pressure loss and increased drag. The straightened vortex 1002 resulting from finlets positioned in the rear half of the aft-fuselage portion beginning at the breakline is shown in FIG. 3B.

Examples of representative finlet numbers and placements are depicted in FIG. 11A-11D. The example number of finlets per side can vary from 1 to 10, preferably 1 to 3 for optimum results.

As shown in FIGS. 4C-4D, in some instances there may be different numbers of (inlets on the port and starboard sides of the aircraft due to interaction of an external component (e.g., bvg described in connection with FIGS. 4C-4F) with the flow field.

Figure 12:
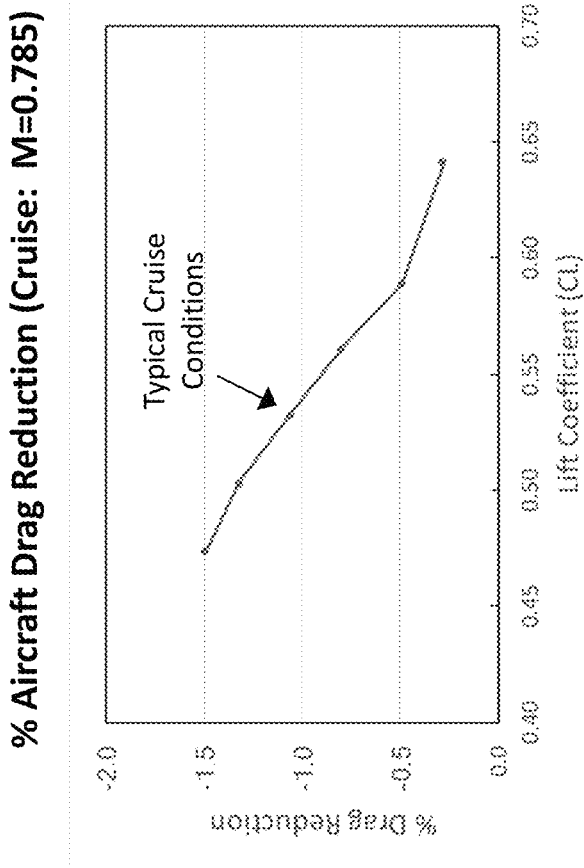
FIG. 12 shows aircraft drag reduction achieved over a range of lift coefficients corresponding to various flight conditions.

FIG. 12 shows, in a graph form, aircraft drag reduction achieved over a range of lift coefficients corresponding to various flight conditions (e.g., climb, cruise, descent, etc.) with the example 30-inch finlet embodiment of the present disclosure. As shown in FIG. 12, for the lift coefficient corresponding to the typical cruise condition of Mach 0.785, drag reduction of approximately 1.1% is achieved.

Figure 13:
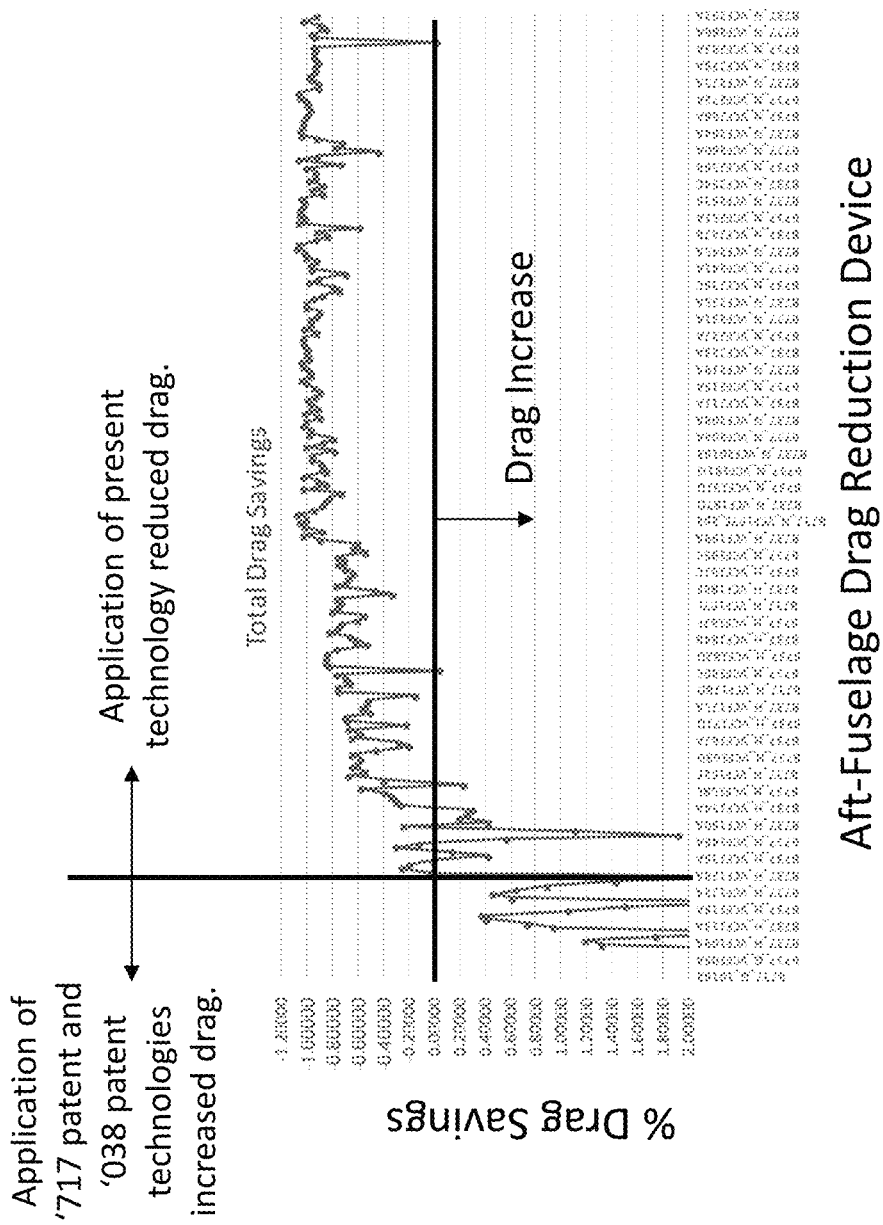
FIG. 13 illustrates the drag increase resulting from the application of the devices representative of the technologies disclosed in the '717 and '038 patents, as well as the drag reduction achieved by the finlet embodiments according to the present disclosure.

FIG. 13 illustrates the drag increase resulting from the application of the devices representative of the technologies disclosed in the '717 and '038 patents, as well as the drag reduction achieved by the finlet embodiments according to the present disclosure. Each dot on the graph represents a different device that was analytically evaluated. The first 20 devices were representative of the technologies outlined in the '717 and '038 patents and were ineffective in reducing aircraft drag as they actually led to an increase in drag. The remaining devices depicted are representative of the application of the technology disclosed in the present disclosure, which led to a reduction in drag. Over 400 device variations were evaluated in connection with the development of the technology of the present disclosure and to optimize their performance, e.g., variations in the number, position, orientation, size (height and length), leading edge sweep, and the like, were evaluated.

The techniques described herein are exemplary and should not be construed as implying any specific limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

The terms "comprise" or "comprising" are to be interpreted as specifying the presence of the stated features, integers, steps or components, but not precluding the presence of one or more other features, integers, steps or components or groups thereof. The terms "a" and "an" are indefinite articles, and as such, do not preclude embodiments having pluralities of articles.

Some embodiments may be described using the expression "one embodiment" or "an embodiment" along with their derivatives. These terms mean that a particular feature, structure, or characteristic described in connection with the embodiment is included in at least one embodiment. The appearances of the phrase "an embodiment" in various places in the specification are not necessarily all referring to the same embodiment.

What is claimed is:

1. A drag reducing system for an aircraft, comprising:
at least one finlet attached to a rear half of an upswept portion of an aft-fuselage of the aircraft on each side of the aft-fuselage, wherein the upswept portion extends rearward starting at a breakline;
wherein each finlet has a leading edge and a tail edge, each finlet being positioned nose-up relative to the direction of airflow about the aft-fuselage, and wherein each finlet is configured to reduce drag on the aircraft by providing a direct flow turning to move a vortex generated at the aft-fuselage by the airflow about the aft-fuselage, thereby straightening the vortex and reducing upsweep of the vortex, and wherein each finlet is configured to additionally reduce drag on the aircraft through generation of a secondary vortex oriented to induce downwash added to the vortex generated at the aft-fuselage, thereby further straightening the vortex generated at the aft-fuselage and reducing the upsweep of the vortex.

2. The system according to claim 1, wherein:
at least one finlet is attached to a first side of the rear half of the upswept portion of the aft-fuselage of the aircraft; and
at least two finlets are attached to a second side of the rear half of the upswept portion of the aft-fuselage of the aircraft.

3. The system according to claim 2, wherein:
each finlet is positioned nose-up relative to the direction of airflow about the aft-fuselage at an angle in the range between 1 and 9 degrees.

4. The system according to claim 2, wherein:
each finlet is at least approximately 25 inches in length.

5. The system according to claim 2, wherein:
each finlet is at least approximately 2 inches in height.

6. The system according to claim 2, wherein:
a leading-edge sweep for each finlet is in the range between 15 and 40 degrees, the leading-edge sweep being defined as an angle formed between a leading edge of a finlet and the height axis of the finlet.

7. The system according to claim 2, wherein:
a spacing between respective centers of the at least two adjacent finlets on the second side of the aft-fuselage is in the range of 0.5 to 4 times the length of one of the at least two adjacent finlets.

8. The system according to claim 2, wherein:
a distance between respective leading edges of at least two adjacent finlets on the second side of the aft-fuselage is in the range of 0.5 to 2 times the length of one of the at least two adjacent finlets.

9. The system according to claim 1, wherein:
each finlet is at least approximately 25 inches in length.

10. The system according to claim 1, wherein:
each finlet is at least approximately 2 inches in height.

11. The system according to claim 1, wherein:
each finlet is positioned nose-up relative to the direction of airflow about the aft-fuselage at an angle in the range between 1 and 9 degrees.

12. The system according to claim 1, wherein:
a leading edge sweep for each finlet is in the range between 15 and 40 degrees, the leading edge sweep being defined as an angle formed between a leading edge of a finlet and the height axis of the finlet.

13. The system according to claim 1, wherein:
two adjacent finlets are provided on at least one side of the aft-fuselage, and a spacing between respective centers of the two adjacent finlets is in the range of 0.5 to 4 times the length of one of the two adjacent finlets.

14. The system according to claim 1, wherein:
two adjacent finlets are provided on at least one side of the aft-fuselage, and a distance between respective leading edges of the two adjacent finlets is in the range of 0.5 to 2 times the length of one of the two adjacent finlets.

15. The system according to claim 1, wherein:
a maximum of ten finlets are attached to the rear half of the upswept aft-fuselage portion of the aircraft on each side of the aft-fuselage.

* * * * *